March 30, 1965  C. W. SUNDIN, JR  3,175,398
MEASURING APPARATUS
Filed April 19, 1962  2 Sheets-Sheet 1
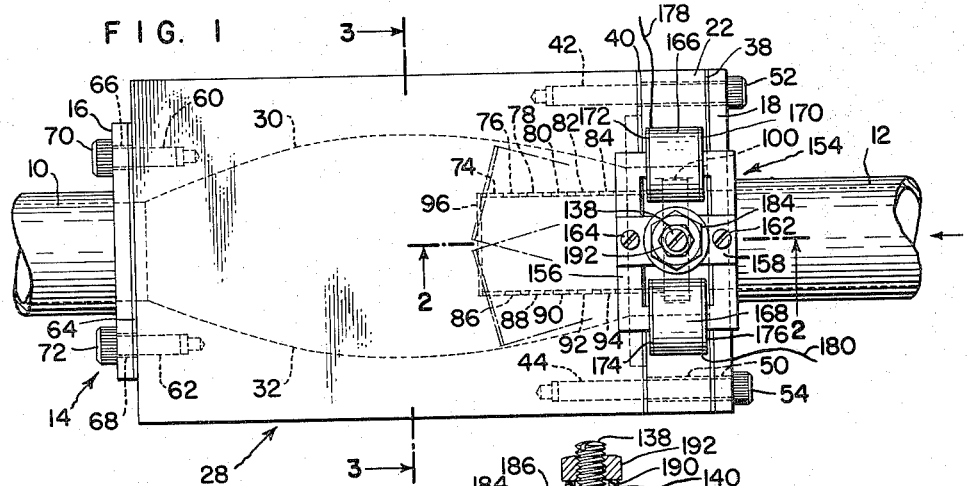
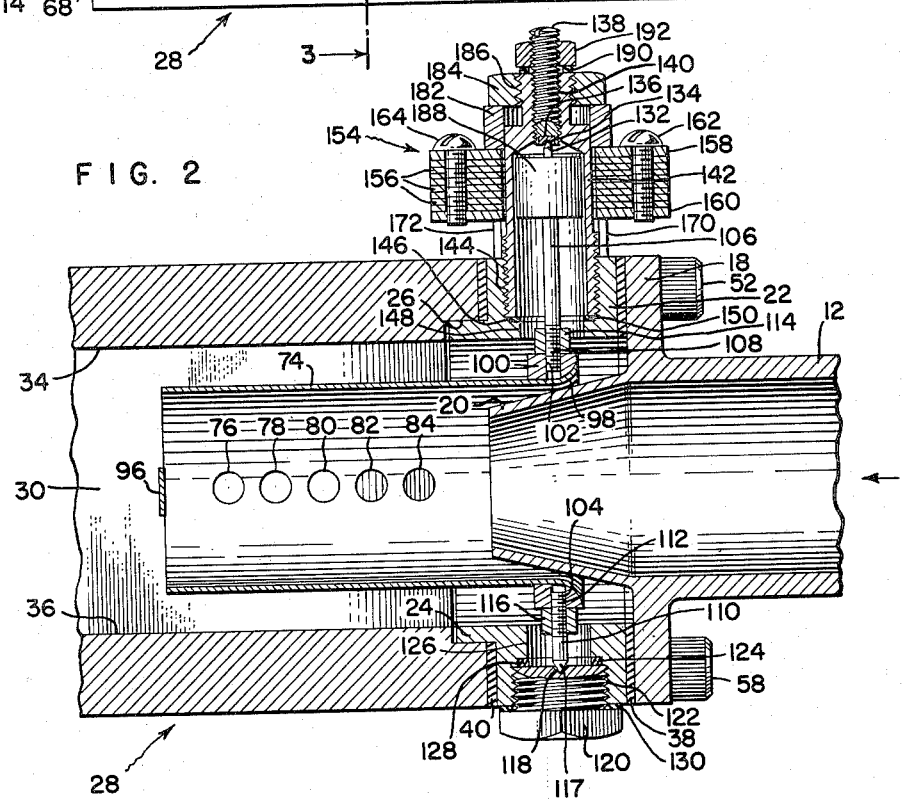
INVENTOR.
CARL W. SUNDIN JR.
BY Arthur H. Swanson
ATTORNEY.

March 30, 1965  C. W. SUNDIN, JR  3,175,398
MEASURING APPARATUS

Filed April 19, 1962  2 Sheets-Sheet 2

*INVENTOR.*
CARL W. SUNDIN JR.
BY
ATTORNEY.

United States Patent Office 3,175,398
Patented Mar. 30, 1965

3,175,398
MEASURING APPARATUS
Carl W. Sundin, Jr., Philadelphia, Pa., assignor to Honeywell Inc., a corporation of Delaware
Filed Apr. 19, 1962, Ser. No. 188,696
4 Claims. (Cl. 73—194)

The object of the present invention is to provide a flow measuring apparatus of an inexpensive construction which will more accurately measure the flow of a fluid stream than has heretofore been possible to accomplish with presently available vibrating rod type flowmeters.

Prior to the present invention vibratable cylindrical rod-shaped flow sensing elements have been used in conduits to measure the flow of fluids passing therethrough. These cylindrical rod-shaped flow sensing elements have not been satisfactory in measuring the flow rate of a fluid because the cylindrical shape of these elements creates certain undesired vortexes in the fluid under measurement that introduce non-linearities in the flow measurement.

More specifically, the present invention obviates the aforementioned non-linear flow measuring problem by providing a characteristically-shaped flow sensing element which will not introduce undesired vortexes into a flowing stream of fluid when the action of this stream is applied thereto.

It is a further object of the invention to provide a flow sensing element which will oscillate when brought into contact with the energy of a flowing stream of fluid at a frequency that is linearly proportional to the flow rate of the stream.

More specifically, it is another object of the present invention to disclose a flow rate sensing element which when surrounded by fluid stream will jointly coact with the energy of the stream to oscillate the fluid and cause the flow sensing element to be oscillated at a frequency which is linearly proportional to the flow of the stream.

When the aforementioned oscillatable flow sensing element is employed in a stream of fluid that is passing through a confined passageway such as a conduit, rather than in an open stream, the sensing element will constrict the flow of fluid passing therethrough to a much less extent than that which is required by flowmeters that employ turbine wheels or orifice plates placed inside the conduit to make a flow measurement. Reduction of the space required by the flow sensing element in the aforementioned manner has the advantage of reducing the drop in pressure occurring across the meter to an unusually small value and this, in turn, allows the fluid to be pumped through the conduit in a more efficient and economical manner.

It is therefore another object of the present invention to provide an oscillatable flow element in a flow line that will enable a fluid to be pumped therethrough in a more efficient and economical manner than has therefore been possible with presently available type flowmeter constructions which make use of turbine wheels or orifice plates.

It is another object of the present invention to disclose a characterized flow pipe section having a perforated tube mounted therein which can be installed in any part of a process flow and wherein the tube will be caused to oscillate at a frequency dependent upon the flow rate of the fluid stream into which it is immersed.

Another object of the invention is to provide a flow sensing element for an electro-mechanical flowmeter that has a perforated restricted tube which oscillates at a frequency dependent upon the flow rate of the fluid into which it is immersed.

It is another object of the present invention to provide a means for indicating the oscillating frequency of the aforementioned flow measuring elements.

Another object of the invention is to employ a single tube flowmeter of the aforementioned type which can be advantageously employed to measure the flow rate of a liquid, gas, slurry or air suspended fine powder stream.

Of the drawing:

FIG. 1 shows an external view of the flowmeter installed in the flow conduit;

FIG. 2 shows a cross-section view taken along the line 2—2 of FIG. 1;

Figure 3:
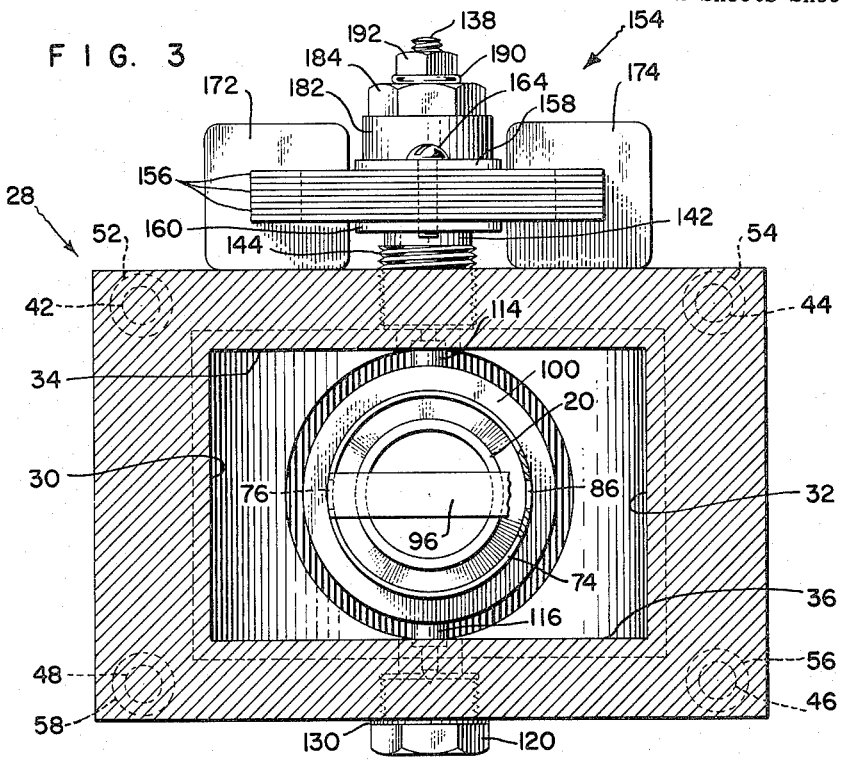
FIG. 3 shows a cross-section view taken along the line 3—3 of FIG. 1.

Referring now to FIGS. 1–3 in detail it can be seen that there is shown two spaced apart end portions 10, 12 of a flow conduit 14. A flange 16 forms the right end of the flow conduit portion 10. Another flange 18 is shown located adjacent to the left end of the flow conduit portion 12. A restriction in the form of a nozzle 20, is positioned, as shown, to form the left end of the flow conduit portion 12.

A first hollow rectangular-shaped housing member 22, which has a cylindrical sleeve portion 24 protruding from its left end is shown slidably engaged with an interior cylindrical wall surface 26 of a second hollow rectangular-shaped housing member 28. The second hollow rectangular-shaped housing member 28 has two oppositely positioned curved inner wall surfaces 30, 32 and two other oppositely positioned flat inner wall surfaces 34, 36.

FIG. 2 shows a first gasket 38 mounted between a left side surface of flange 18 and a right end surface of the first housing member 22. FIG. 2 also shows a second gasket 40 mounted between a left side surface of the first housing member 22 and the right end surface of the second housing member 28.

It has been discovered that the best flow measurements are obtained if the nozzle 22 is allowed to direct the fluid stream under measurement, as shown in FIG. 2, into the tube 74 from a position that is to the left of the center line of the point pivot shafts 106, 110. It should be understood however that it may be desirable, because of the viscous nature of the fluid under measurement to have the open end of the nozzle 22 positioned further to the right of the position shown in FIG. 2. In measuring the flow of certain types of viscous fluids it may be desirable to enlarge the nozzle and/or to move the edge of its open end to the right of the position shown in FIG. 2, such as for example, to a position where the nozzle edge is in alignment with the center line of the point pivot bearing shafts 106, 110.

The four corner portions of the right end of the second rectangular housing member 28 are shown provided with cylindrical tapped out apertured wall surfaces 42, 44, 46, 48. The rectangular corner portions of the flange 18, the first rectangular-shaped housing member 22 and the gaskets 38, 40 are each provided with four apertured wall portions, such as the one shown at 50, which are aligned with the associated tapped out wall portions 42–48 before connecting the parts 18, 38, 22, 40 to housing 28.

Connecting means such as the tap bolts 52, 54, 56, 58 are passed through the apertures in the flange 18, gasket 38, first hollow rectangular-shaped housing 22 and the gasket 40, and threadedly connected to their associated tapped out apertured wall surfaces 42–48. When the bolts 52–58 are tightened the gaskets 38, 40 will be compressed and a fluid tight joint will be formed between the flange 18 and the housing members 22, 28.

Each of the four corner portions of the left end of the second hollow rectangular housing 28 are provided with a cylindrical tapped out apertured wall surface such as are shown, e.g., at 60, 62.

The flange 16 and the gasket 64 are each provided with apertured wall portions such as are shown, e.g., at 66, 68; which are aligned with other associated tapped out apertured wall surfaces such as those shown at 60, 62.

In order to join the parts 16, 64 to the housing 28, a plurality of connecting means, such as the tap bolts 70, 72, are passed through the apertures, e.g., 66, 68 in the flange 16 and the gasket 64 and are threadedly connected to their associated tapped out apertured wall portions 60, 62. When the bolts 70, 72 are tightened the gasket 64 will be compressed and a fluid tight joint will be formed between the flange 16 and the second housing member 28.

Within and extending between portions of the first and second hollow rectangular-shaped housing members 22, 28 there is shown an oscillatable tube 74 which is made of a light weight material such as an aluminum or a plastic material.

A first series of cylindrical apertures 76, 78, 80, 82, 84 is shown in one side wall portion of the tube 74. A second series of cylindrical apertures 86, 88, 90, 92, 94 is shown formed in opposite side wall portions of the tube 74 and aligned in the manner shown with the first-mentioned series of apertures.

The left end of the tube 74 is provided with a rectangular-shaped plate 96, forming a restriction, that extends across the tube 74 and is fixedly connected thereto by a suitable welding material.

The other end of the tube 74 is provided with a flared portion 98. A substantially ring-shaped member 100 is fixedly connected by welding material or by swaging to the external surface of the flared portion 98.

FIG. 2 shows oppositely positioned, cylindrically tapped out, threaded wall portions 102, 104 in the ring-shaped member 100.

A first point pivot shaft 106 is shown having threads 108 on one of its end portions. The threads 108 are shown in engagement with the threaded wall portions 102.

A second point pivot shaft 110 is shown having threads 112 on one of its end portions. These threads 112 are shown in engagement with the threaded wall portion 104.

A first jam nut 114 is employed to retain the first point pivot shaft 106 in any one of a number of adjustably fixed positions along the thread 102 in the ring-shaped member 100.

A second jam nut 116 is similarly employed to retain the second point pivot shaft 110 in any one of a number of adjustably fixed positions along the thread 104 of the ring-shaped member 100.

The apex of the cone-shaped end 117 of the point pivot shaft 110 is shown in point contact with the apex of an associated cone-shaped surface 118 formed in the lower end of the shoulder bolts 120.

It should be understood that the parts of the tube 74 and shafts 106, 110 protruding therefrom can be made of a unitary multipiece construction or be made of a unitary single die cast piece construction.

As is best shown in FIG. 2 of the drawing, the first housing member 22 is provided with three wall portions 122, 124, 126 which are of progressively decreasing diameters to accommodate the passage of the point pivot shaft 110 therethrough.

A first gasket 128 which is of a ring-shaped configuration is shown in contact with the wall portion 124 and a second gasket 130 which is also of a ring-shaped configuration is shown mounted on the underside of the head of the shoulder bolt 120. To assemble these flowmeter parts in the position shown in FIG. 2 the threads of the bolt 120 are brought into engagement with threads which are shown formed on the wall portion 122 of the housing 22.

When the bolt 120 has been threadedly rotated into the position shown in FIG. 2 the gaskets 128, 130 will be compressed so that a fluid tight joint is formed between the bolt 120 and the first housing member 22.

Referring now to the point pivot shaft 106 it can be seen that this shaft has a cone-shaped end 132, the apex of which is in point contact with the apex of an associated cone-shaped surface 134 formed in a pivot-bearing block 136. This pivot block 136 is, in turn, shown fixedly mounted in the base of a set screw member 138.

The set screw member 138 is threadedly mounted along the cylindrically threaded surface 140 of a non-conductive, non-magnetic bearing support member 142.

As is best shown in FIG. 2 of the drawing, the first housing member 22 is provided with three wall portions 144, 146, 148 which are of a progressively decreasing diameter to accommodate the passage of the point pivot shaft 106 therethrough.

A gasket 150 which is of a ring-shaped configuration is shown in contact with the wall portion 146.

To assemble in the position shown in FIG. 2 the threads of the non-conductive bearing support member 142 are brought into engagement with threads which are shown formed on the wall portion 144 of the housing member 22.

When the bearing support member 142 has been rotated into the position shown in FIG. 2 the gasket 150 will be compressed so that a fluid tight joint is formed between the bottom portion of the bearing support member 142 and the first housing member 22.

A magnetic coil pickup unit 154 comprising transformer E-laminations 156; a pair of insulator plates 158, 160, held together by means of screw members 162, 164; two conductive wire coil members 166 and 168 which are each provided with two non-conductive support plates 170, 172; 174, 176; and, associated electrical connections 178, 180 extending therefrom are slid over the member 142 and into the position as shown in FIGS. 2 and 3.

An insulator 182 of a ring-shaped configuration is then slid over the member 142 in the manner shown in the aforementioned figures.

The nut 184 is then threadedly mounted in a tight position on the threads 186 formed on the upper end of the member 142 by bringing the lower surface of the nut 184 into contact with the insulator 182.

When the parts of the magnetic coil pickup unit 154 have been assembled in the manner shown in FIGS. 2 and 3 it can be seen that the four non-conductive support plates 170–176, the first housing member 22, the transformer E-laminations 156 and the pickup coils 166, 168 will be aligned with permanent magnet 188 that is fixedly mounted on the point pivot shaft 106.

A gasket 190, which is of a ring-shaped configuration, is shown surrounding the set screw 138 and positioned between the upper surface of the nut 184 and the lower surface of the nut 192. When the nut 192 is moved to a tightened position on the set screw 138 the gasket 190 will be compressed and a fluid tight joint will be formed between the nut 192 and the uppermost surface of the bearing support member 142.

Figure 4:
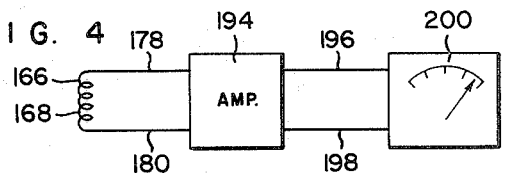
FIG. 4 shows in block diagram form how the measuring coils of the flowmeter are connected to a flow indicator.

FIG. 4 shows how the previously described electrical conductors 178, 180, that are connected to the coils 166, 168 are connected by way of an amplifier 194 and the electrical conductors 196, 198 to a frequency meter 200.

When the aforementioned flowmeter is placed in a flow line as is best disclosed in FIGS. 1 and 2 and a fluid stream flows in a right-to-left direction, as indicated by the flow direction arrows, the fluid stream will be directed through the fixed nozzle 20, through the pivoted tubes 74 and simultaneously passes out the restricted left end of the tube and out through the first and second series of apertures 76–84; 86–94 located on opposite sides of the tube 74.

As the fluid passes through and out of the tube 74 in the aforementioned fashion the tube 74 will be displaced in a lateral oscillating manner about its point pivot members 117, 118; 132, 134 in the manner shown in dotted line form for the tube in FIG. 11.

Oscillating movement of the tube 74 is brought about by the coaction which takes place between the tube and the fluid stream. It has also been found that this single, restricted, perforated tube construction permits an interaction to take place between a flowing stream and the tube 74 which will introduce oscillating motion into the tube 74 at a frequency which is proportional to the flow rate of the fluid stream.

An increase in the flow rate of the fluid stream will cause a reduction in angle through which the tube will be moved about its pivots 132, 134; 117, 118. A decrease in the flow rate of the fluid stream will cause an increase in the angle through which the tube 74 will be allowed to move in the aforementioned associated pivots.

It can thus be seen from the aforementioned description of the operation of the tube 74 that an increase in the rate of the fluid stream will cause, e.g., the amplitude of the tube 74 to decrease and the frequency at which it oscillates its associated pivot shafts 106, 110 to increase.

When changes occur in the flow rate of the stream the coaction of the tube 74 which the fluid stream will thus cause the shaft 106, 110 to be oscillated at a frequency that is always kept proportional to the flow rate of the fluid that is passing through the flow conduit. The permanent magnet 188 mounted on the shaft 106 is used to transmit the frequency at which the shaft 110 is rotated through the non-conductive, non-magnetic member 142. The magnetic pickup coils 166, 168 are connected as shown adjacent the magnet 188. As changes occur in the angular distance through which the magnet 188 is being moved, by the previously-mentioned coaction of the flow stream and tube 74 this action will cause a variation in the flux to occur in the coils 166, 168.

The value indicated on the frequency meter 290 will thus be proportional to the frequency at which the tube 74 is oscillating. The frequency at which the tube 74 is caused to oscillate is always maintained proportional to the flow rate of the fluid stream under measurement and the value which is indicated on the frequency meter 200 will therefore be a true linear value of the flow rate of the fluid stream.

The flowmeter described herein thus provides a flow sensing element in the form of an oscillatable, partially perforated, restricted flow tube which is readily adapted for insertion in a flowing fluid stream so that a different natural period of tube oscillation occurs for each one of a different number of flow rates of the stream thereby providing an accurate measurement of any flow rate of the fluid stream.

What is claimed is:

1. A flowmeter to measure the flow rate of a fluid stream flowing in an upstream to downstream direction, comprising a unitary, elongated flow sensing member, said member having an inner and outer wall surface and being completely immersed in the stream, the inner wall surface of the member being constructed to form an open elongated passageway extending between an upstream and downstream portion of the fluid under measurement, the upstream end of the member being operably connected for oscillation on stationary pivot blocks whose axes are perpendicular to the flow of the fluid stream under measurement, the flow sensing member being constructed to oscillate on said pivot blocks at a frequency that is linearly proportional to the flow rate of the fluid stream as the fluid under measurement passes through the passageway formed by the inner wall of the member, the flow sensing member being comprised of a perforated tube having a restriction extending across a portion of its downstream end, a conduit positioned to surround the flowing stream under measurement, means connected to the conduit to accommodate the mounting of the stationary pivot blocks on which the tube oscillates in opposite side portions of the conduit and wherein an electromechanical responsive means is operably associated with the means to measure the frequency at which the flow sensing member is oscillated.

2. A flowmeter to measure the flow rate of a fluid stream flowing in an upstream to downstream direction, comprising a unitary, elongated flow sensing member, said member having an inner and outer wall surface and being completely immersed in the stream, the inner wall surface of the member being constructed to form an open elongated passageway extending between an upstream and downstream portion of the fluid under measurement, the upstream end of the member being operably connected for oscillation on stationary pivot blocks whose axes are perpendicular to the flow of the fluid stream under measurement, the flow sensing member being constructed to oscillate on said pivot blocks at a frequency that is linearly proportional to the flow rate of the fluid stream as the fluid under measurement passes through the passageway formed by the inner wall of the member, the flow sensing member being comprised of a perforated tube having a fluid stream flow restriction in the form of a flat plate strip extending across and being fixedly connected to opposite end surface portions of the downstream end of the tube to reduce the flow of the fluid stream passing therethrough, a conduit positioned to surround the flowing stream under measurement, means connected to the conduit to accommodate the mounting of the stationary pivot blocks in the upstream end of the tube, and wherein an electromechanical responsive means is operably associated with the means to measure the frequency at which the flow sensing member is oscillated.

3. A flowmeter to measure the flow rate of a fluid stream flowing in an upstream to downstream direction, comprising a unitary, elongated flow sensing member, said member having an inner and outer wall surface and being completely immersed in the stream, the inner wall surface of the member being constructed to form an open elongated passageway extending between an upstream and downstream portion of the fluid under measurement, the upstream end of the member being operably connected for oscillation on stationary pivot blocks whose axes are perpendicular to the flow of the fluid stream under measurement, the flow sensing member being constructed to oscillate on said pivot blocks at a frequency that is linearly proportional to the flow rate of the fluid stream as the fluid under measurement passes through the passageway formed by the inner wall of the member, the flow sensing member being comprised of a perforated tube having pairs of apertures formed in diametrically opposite wall portions thereof and having a partial fluid stream flow restriction in the form of a rectangular flat plate extending across and being fixedly connected to opposite end portions of the downstream end of the tube, the central axes of the flat plate that extends across the tube being parallel to the central axes passing through each pair of apertures formed in the opposite wall portions of the tube and an electromechanical responsive means is operably associated with the means to measure the frequency at which the flow sensing member is oscillated.

4. A flowmeter to measure the flow rate of a fluid stream flowing in an upstream to downstream direction, comprising a unitary, elongated flow sensing member, said member having an inner and outer wall surface and being completely immersed in the stream, the inner wall surface of the member being constructed to form an open elongated passageway extending between an upstream and downstream portion of the fluid under measurement, the upstream end of the member being operably connected for oscillation on stationary pivot blocks whose axes are perpendicular to the flow of the fluid stream under measurement, the flow sensing member being constructed to oscillate on said pivot blocks at a frequency that is linearly proportional to the flow rate of the fluid stream as the fluid under measurement passes through the passageway formed by the inner wall of the member, the flow sensing member being of a tube-shaped configuration having a fluid inlet at its upstream end and a fluid outlet at its downstream end, said fluid outlet end portion having a plate forming a partial restriction therein, a plurality of apertures formed in and extending through opposite side wall portions of the member, the fluid inlet tube portion being terminated with a flared end, a nozzle spaced within and in spaced relation with the flared end to direct the fluid stream under measurement into the tube and simultaneously through the apertures and the space formed between the plate and the end of the tube forming the fluid outlet and wherein an electromechanical responsive means is operably associated with the means to measure the frequency at which the flow sensing member is oscillated.

References Cited by the Examiner
UNITED STATES PATENTS

| | | | |
|---|---|---|---|
| 1,935,445 | 11/33 | Heinz | 73—194 |
| 2,524,747 | 10/50 | Ayres et al. | 73—186 |
| 2,809,520 | 10/57 | Richard | 73—194 |
| 2,813,424 | 11/57 | Liepmann et al. | 73—194 |
| 2,873,606 | 2/59 | Ekstrom | 73—228 |
| 3,116,639 | 1/64 | Bird | 73—194 |

RICHARD C. QUEISSER, *Primary Examiner.*

ROBERT L. EVANS, DAVID SCHONBERG,
*Examiners.*